US010757347B1

(12) United States Patent
Corwin et al.

(10) Patent No.: US 10,757,347 B1
(45) Date of Patent: Aug. 25, 2020

(54) MODIFYING DISPLAY OF AN OVERLAY ON VIDEO DATA BASED ON LOCATIONS OF REGIONS OF INTEREST WITHIN THE VIDEO DATA (71) Applicant: Facebook, Inc., Menlo Park, CA (US)

(72) Inventors: Lawrence Alan Corwin, San Francisco, CA (US); Eric W. Hwang, San Jose, CA (US); David Kaufman, San Francisco, CA (US); Alan Liu, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 16/407,165

(22) Filed: May 8, 2019

(51) Int. Cl.
*H04N 5/272* (2006.01)
*H04N 7/14* (2006.01)
*H04N 5/445* (2011.01)

(52) U.S. Cl.
CPC ......... *H04N 5/272* (2013.01); *H04N 5/44504* (2013.01); *H04N 7/14* (2013.01)

(58) Field of Classification Search
USPC ...................................... 348/14.07
See application file for complete search history.

(56) References Cited

U.S. PATENT DOCUMENTS

| 10,169,850 | B1* | 1/2019 | Carey | G06T 7/11 |
| 2007/0097268 | A1* | 5/2007 | Relan | H04N 9/74 |
| | | | | 348/584 |
| 2012/0013770 | A1* | 1/2012 | Stafford | H04N 5/2621 |
| | | | | 348/239 |
| 2012/0092438 | A1* | 4/2012 | Guzman Suarez | H04N 7/15 |
| | | | | 348/14.03 |

* cited by examiner

Primary Examiner — Amal S Zenati
(74) Attorney, Agent, or Firm — Fenwick & West LLP (57) ABSTRACT

A client device receives video data and displays the video data via a display device. An overlay including content other than the video data is also displayed in a specific area of the display device and at least partially occludes the video data displayed within the specific area of the display device. The client device identifies coordinates of regions of interest within frames of the video data. When the client device determines that at least a threshold amount of a region of interest within the video data is displayed within the specific area of the display device, where the overlay is displayed, for at least a threshold amount of time, the client device increases a transparency of the overlay, repositions the overlay, of otherwise modifies the overlay to prevent the overlay from occluding the region of interest.

24 Claims, 4 Drawing Sheets

MODIFYING DISPLAY OF AN OVERLAY ON VIDEO DATA BASED ON LOCATIONS OF REGIONS OF INTEREST WITHIN THE VIDEO DATA

BACKGROUND

This disclosure relates generally to presenting an overlay on video data displayed by a client device, and more specifically to modify presentation of the overlay based on locations of regions of interest within the video data.

Increasingly, client devices, online systems, and networks allow users to exchange larger amounts of content with each other. For example, an online system allows its users to exchange video data captured by different users via client devices associated with the user. In a specific example, an online system may establish video messaging between a user and an additional user, allowing the users to exchange video data captured by their respective client devices in real-time or in near real-time.

When exchanging video data with another client device, a client device presents video data received from the other client device via a display device and also presents video data locally captured by the client device on the display device. This allows a user of the client device to have an idea of the video data that the other client device is receiving. Many client devices display the locally captured video data as an overlay that is presented in a specific area of the display device that occludes a portion of the received video data presented in the specific area of the display device. Hence, objects in the received video data displayed by the client device may be obscured from the user's view by the overlay. As objects, such as people, move around within the received video data, different objects may be obscured by the displayed overlay at different times or for different durations. This prevents the user of the client device from viewing video data locally captured by the client device along with the received video data without potentially having objects or people within the received video data from being at least partially obscured by the overlay displaying the locally captured video data.

SUMMARY

Various client devices associated with users of an online system include one or more image capture devices. An image capture device included in a client device is configured to capture video data of a local area surrounding the client device, for example, during a video call or when the user turns on the video capturing feature. Additionally, the client device includes a controller coupled to the one or more image capture devices. The controller applies one or more models to video data captured by an image capture device and modifies video data captured by the image capture device or parameters of the image capture device based on application of the one or more models.

The controller maintains and enforces one or more privacy settings for users and other people captured in the video data or other data in various embodiments. For example, the controller may have a default privacy setting preventing the controller from identifying a user until the user manually alters the privacy setting to allow the controller to identify the user. The default privacy setting may also extend to any captured video data, audio data, image data, or other data so that a user may select whether to allow the image capture device to identify any user in the data. Additionally, the privacy setting also regulates transmission of information from the client device to another entity (e.g., another client device or a third party system). The various privacy settings allow a user to control the identification of the user and the storage and sharing of any user-related data. The privacy settings also may be enforced individually with respect to each individual. For example, a user opting in a user identification feature may not change the default privacy settings for other users that may be incidentally captured in the local area surrounding the client device.

Different client devices may exchange video data with each other. For example, a receiving client device receives remote video data captured by a sending client device and displays the remote video data via a display device. In the preceding example, the sending client device may also capture local video data of an area surrounding the receiving client device and transmits the local video data to the sending client device for presentation. The receiving client device also displays the local video data in conjunction with the remote video data via the display device. For example, the receiving client device displays the local video data via an overlay that is displayed in a specific area of the display device overtop of the remote video data. In an example, the overlay is a rectangular or square area positioned proximate to an upper left corner or an upper right corner of the display device.

As objects, such as people, move about while the sending client device captures the remote video data, positions of the objects within the remote video data change. This causes the objects to be displayed at different locations of the display device. Hence, objects may move within the remote video data so they are displayed in the specific area of the display device in which the overlay is displayed, causing the overlay to obscure the object when the receiving client device displays the remote video data. This may prevent a user of the receiving client device from viewing portions of the remote video data via the display device.

To prevent the displayed overlay from occluding an area of interest within the remote video data displayed on the display device, the receiving client device identifies regions of interest within the remote video data. In various embodiments, the receiving client device identifies regions of interest within the remote video data using bounding boxes, where a bounding box specifies coordinates within a frame of video data specifying a boundary of a region of the remote video data including an object. The sending client device may apply one or more models to the remote video data that identify regions of interest within the remote video data and generate metadata associated with the remote video data that include coordinates of regions of interest identified within the remote video data. The sending client device transmits the metadata to the receiving client device in association with the remote video data, so the receiving client device identifies regions of interest within the remote video data from the received metadata associated with the remote video data. Alternatively, the receiving client device applies one or more models to the remote video data after receiving the remote video data. The one or more models applied by the receiving client device identify coordinates within frames of the remote video data that correspond to regions of interest within the remote video data.

The receiving client device determines whether at least a threshold amount of a region of interest within the remote video data is displayed within the specific area of the display device displaying the overlay for at least a threshold amount of time. For example, the receiving client device determines whether a threshold amount of a bounding box of a region of interest within the remote video data is displayed within the specific area of the display device for at least the threshold amount of time. In response to determining that a region of interest is displayed within the specific area of the display device (where the overlay is displayed) for at least a threshold amount of time, the receiving client device modifies the display of the overlay, so the overlay does not partially obscure the remote video data displayed in the specific area of the display device, This allows the region of interest within the remote video data to be displayed in the specific area of the display device without being obscured by the overlay. For example, the receiving client device increases the transparency of the overlay (including the local video data 520 displayed via the overlay), so the overlay does not obscure the region of interest when at least the threshold amount of the region of interest is displayed in the specific region for at least a threshold amount of time. The receiving client device may increase the transparency of the overlay by an amount (e.g., a percentage) that is directly related to an amount (e.g., a percentage) of the region of interest displayed within the specific area of the display device or may increase the transparency of the overlay by a specific amount in response to determining the threshold amount of the region of interest is displayed within the specific area for at least the threshold amount of time. Alternatively, the receiving client device repositions the overlay to be displayed in an alternative area of the display device, where the alternative area of the display device does not include a region of interest of the remote video data.

When the threshold amount of the region of interest is no longer displayed in the specific area of the display device, the client device decreases the transparency of the overlay (or repositions the overlay back to the specific area of the display device). In some embodiments, the receiving client device decreases the transparency of the overlay in response to less than the threshold amount of the region of interest being displayed within the specific area for a specific time interval. In some embodiments, the specific time interval is the same as the threshold amount of time, while in other embodiments, the specific time interval is different than the threshold amount of time.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
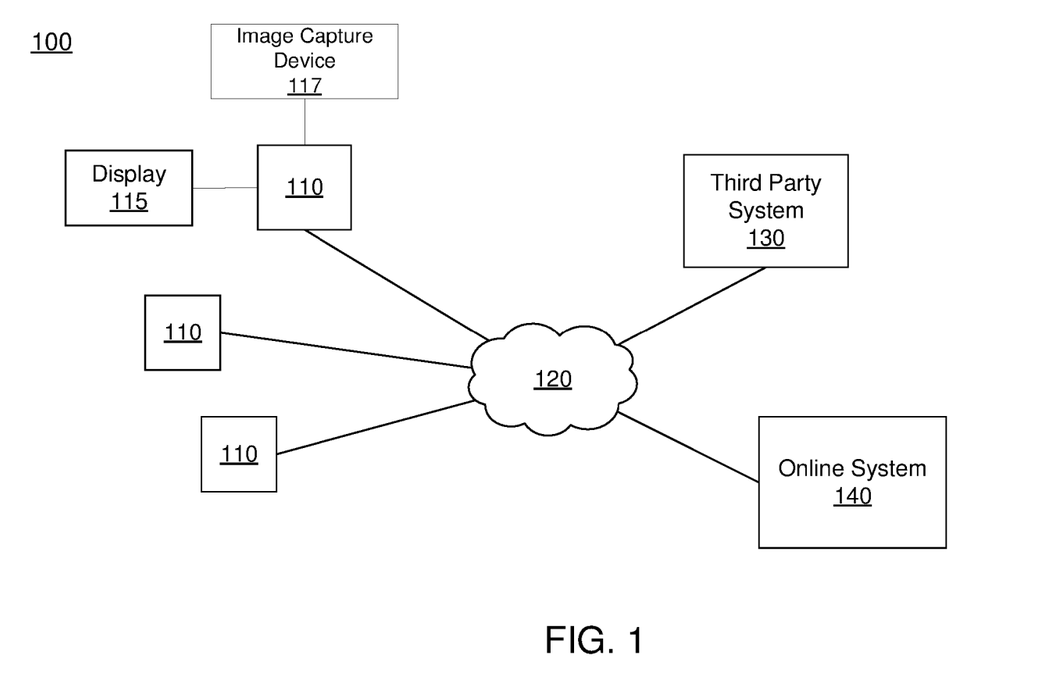
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. Additionally, in the system environment 100 shown by FIG. 1, a controller 117 is coupled to a client device 110. In alternative configurations, different and/or additional components may be included in the system environment 100. For example, the online system 140 is a social networking system, a content sharing network, or another system providing content to users.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™. As further described below in conjunction with FIG. 2, a client device 110 includes a display device 115 configured to present content, and one or more image capture devices configured to capture image or video data of a local area surrounding the client device 110.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 3. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as advertisements, content, or information about an application provided by the third party system 130.

Figure 2:
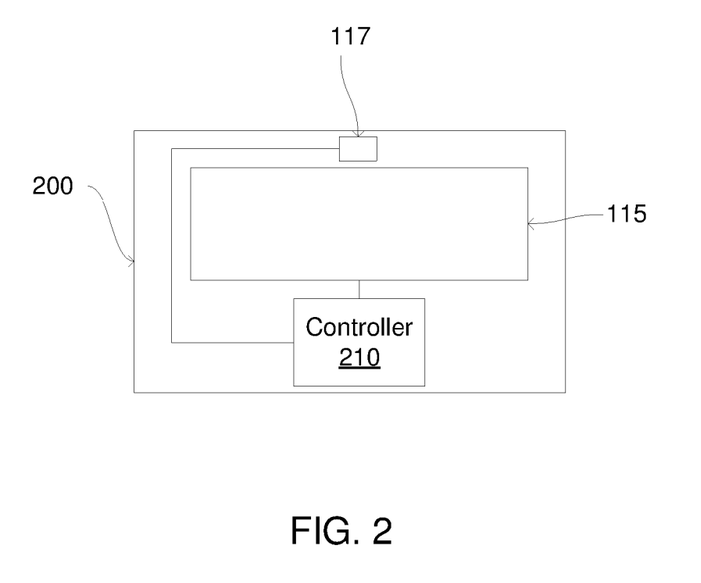
FIG. 2 is a block diagram of a client device, in accordance with an embodiment.

FIG. 2 is a block diagram of an embodiment of a client device 117. In the embodiment shown in FIG. 2, the client device 110 includes a display device 115 and an image capture device 117, as well as a controller 210. However, in other embodiments, the client device 110 includes different or additional components than those shown in FIG. 2.

The display device 115 may be integrated into the client device 110 or coupled to the client device 110. For example, a display device 115 integrated into a client device 110 is a display screen included in the client device 110. Alternatively, the display device 115 is a monitor or other display coupled to the client device 110. The display device 115 presents image data or video data to a user. Image or video data presented by the display device 115 is determined by an application executing on the client device 110. Different applications may be included on the client device 110, so execution of different applications changes the content presented by the user by the display device 115.

The image capture device 117 captures video data or images of a local area surrounding the client device 110 and within a field of view of the image capture device 117. In some embodiments, the image capture device 117 includes one or more cameras, one or more video cameras, or any other device capable of capturing image data or video data. Additionally, the image capture device 117 may include one or more filters (e.g., used to increase signal to noise ratio). Various parameters (e.g., focal length, focus, frame rate, ISO, sensor temperature, shutter speed, aperture, focal point etc.) configure capture of video data or image data by the image capture device 117. Hence, modifying one or more parameters of the image capture device 117 modifies video data or image data captured by the image capture device 117 after modification of the one or more parameters. While FIG. 2 shows a single image capture device 117 included in the client device 110, in other embodiments, the client device 110 includes any suitable number of image capture devices 117. In various embodiments, users have the options to prevent any recordings (video, voice, etc.) from being stored locally in the client device and/or on the cloud and also to delete any recordings, if saved.

The controller 210 is coupled to the image capture device 117 and comprises a storage device coupled to a processor. In various embodiments, the controller 210 is also coupled to the display device 115. The controller 210 includes instructions that, when executed by the processor, apply one or more models to video data captured by the image capture device 117. In various embodiments, the one or more models are applied to video data, audio data, image data, or any combination of data captured by the image capture device 117 or any other devices included in or coupled to the client device 110. As further described below in conjunction with FIG. 4, models applied to captured video data by the controller 210 apply one or more rules to characteristics of captured video data to identify regions of interest within the captured video data that identify objects, people, movement, or any other suitable content of the captured video data. Based on application of the models and subject to one or more privacy settings, the controller 210 may modify the captured video data or modifies one or more parameters of the image capture device 117 so subsequently captured video data is modified. For example, users may authorize the controller 210 to apply models that locate the users in captured video data based on characteristics of the captured video data, and identify coordinates of frames within the captured video data including a user (or including another object). The controller 210 may modify the captured video data to more prominently include the located users or modifies one or more parameters (e.g., focal length, magnification or zoom, cropping of captured video data) of the image capture device 117 so additional video data more prominently includes the located users. The additional video data more prominently includes a located person by presenting the located person with at least a threshold set of dimensions (e.g., with at least a threshold height or a threshold width), presents the located person in at least a threshold amount of a field of view of the image capture device 117 or in at least a threshold amount of a frame of the captured video data, or presents the located person in one or more specific locations within the captured video data. However, models applied by the controller 210 may identify any suitable components of video data captured by the image capture device 117 and modify parameters of the image capture device 117 or modify captured video data accordingly.

In various embodiments, the client device 110 includes one or more audio capture devices, such as microphones. For example, the client device 110 includes an array of microphones configured for beamforming in two or three dimensions. The audio capture devices capture audio signals from different regions within a local area surrounding the client device 110. In various embodiments, the one or more audio capture devices are coupled to the controller 210, which maintains information identifying different regions of the local area surrounding the client device 110; for example, the controller 210 identifies 24 fifteen degree regions of the local area surrounding the client device 110 originating from a point within the client device 110, identifying regions of a 360 degree local area surrounding the client device 110.

The one or more audio capture devices are coupled to the controller 210. Subject to user selected privacy settings, the controller 210 applies one or more models, such as machine learned models or other sound recognition models, to audio data captured from a region of the local area surrounding the client device 110. The controller 210 includes information identifying users or objects (e.g., a television, a mobile device), and application of the one or more models to audio captured from a region of the local area surrounding the client device 110 determines whether the captured audio data includes audio data from a user or an object identified by the controller 210 or ambient noise. In some embodiments, the one or more models applied by the controller 210 determine a particular user or a particular object identified by the controller 210 from which the one or more audio capture devices captured audio in the region. In other embodiments, the client device 110 communicates audio data captured by one or more audio devices to the online system 140, which applies the one or more models to determine whether the audio data includes audio data captured from an identified object or user or to determine a particular identified user or object from which audio data was captured. The online system 140 provides the client device 110 with an indication of whether the captured audio data includes audio data captured from an identified object or user or provides information specifying a particular identified object or user from which the audio data was captured. The controller 210 or the online system 140 similarly determines whether audio captured from other regions surrounding the local area of the client device 110. Based on determinations of identified objects or users from which audio data in different regions was captured, the controller 210 modifies positioning of one or more audio devices to improve quality of audio captured from one or more regions. For example, the controller 210 repositions one or more audio capture devices to improve quality of audio captured from a region surrounding the local area from which audio data was captured from a specific user or from a specified object. Similarly, the controller 210 may reposition or otherwise modify one or more parameters of the image capture device 117 based on regions of the local area surrounding the client device 110 from which audio data was captured from different users or objects. The one or more audio devices and the image capture device 117 may be directed to different portions of the local area surrounding the client device 110 in various embodiments. For example, the image capture device 117 is directed to an object described by a user, while the controller 210 directs one or more audio capture devices to a region of the local area surrounding the client device 110 from which audio data was captured by a specific user.

The online system 140 and the controller 210 of the client device 110 cooperatively or individually maintain and enforce one or more privacy settings for users or people identified from captured video data or other data in various embodiments. A privacy setting of a user or person determines how particular information associated with a user or person can be shared, and may be stored in association with information identifying the user or the person. In some embodiments, the controller 210 retrieves privacy settings for one or more users maintained by the online system 140. In one embodiment, a privacy setting specifies particular information associated with a user and identifies other entities with whom the specified information may be shared. Examples of entities with which information can be shared may include other users, applications, third party systems 130 or any entity that can potentially access the information. Examples of information that can be shared by a user include image data including the user or the person, audio data including audio captured from the user or the person, video data including the user or the person, and the like.

For example, in particular embodiments, privacy settings may allow a first user to specify (e.g., by opting out, by not opting in) whether the online system 140 may receive, collect, log, or store particular objects or information associated with the user for any purpose. In particular embodiments, privacy settings may allow the first user to specify whether particular video capture devices, audio capture devices, applications or processes may access, store, or use particular objects or information associated with the user. The privacy settings may allow the first user to opt in or opt out of having objects or information accessed, stored, or used by specific devices, applications or processes. The online system 140 may access such information in order to provide a particular function or service to the first user, without the online system 140 having access to that information for any other purposes. Before accessing, storing, or using such objects or information, the online system may prompt the user to provide privacy settings specifying which applications or processes, if any, may access, store, or use the object or information prior to allowing any such action. As an example and not by way of limitation, a first user may transmit a message to a second user via an application related to the online system 140 (e.g., a messaging app), and may specify privacy settings such messages should not be stored by the online system 140.

The privacy settings maintained and enforced by the online system 140 or by the controller 210 may be associated with default settings. In various embodiments, the controller 210 does not identify a user within captured video data, audio data, image data, or other data unless the controller 210 obtains a privacy setting from the user authorizing the controller 210 to identify the user. For example, a privacy setting associated with a user has a default setting preventing the controller 210 from identifying the user, so the controller 210 does not identify the user unless the user manually alters the privacy setting to allow the controller 210 to identify the user. Additionally, an alternative privacy setting regulates transmission of information from the client device 110 identifying the user to another entity (e.g., another client device 110, the online system 140, a third party system 130) in various embodiments. The alternative privacy setting has a default setting preventing transmission of information identifying the user in various embodiments, preventing the controller 210 from transmitting information identifying the user to other entities unless the user manually modifies the alternative privacy setting to authorize transmission). The controller 210 maintains the one or more privacy settings for each user identified from captured video data or other data, allowing user-specific control of transmission and identification of each user. In some embodiments, the controller 210 prompts a person to provide privacy settings when the controller 210 initially identifies the person from captured data and stores the provided privacy settings in association with information identifying the person.

In various embodiments, for the online system 140 or various components of the client device 110 that have functionalities that may use, as inputs, personal or biometric information of a user for user-authentication or experience-personalization purposes, a user may opt to make use of these functionalities to enhance their experience using the device and the online system. As an example and not by way of limitation, a user may voluntarily provide personal or biometric information to the online system 140. The user's privacy settings may specify that such information may be used only for particular processes, such as authentication, and further specify that such information may not be shared with any third-party or used for other processes or applications associated with the online system 140. As another example and not by way of limitation, the online system 140 may provide a functionality for a user to provide voice-print recordings to the online system 140. As an example and not by way of limitation, if a user wishes to use this function of the online system 140, the user may provide a voice recording of his or her own voice to provide a status update on the online system 140. The recording of the voice-input may be compared to a voice print of the user to determine what words were spoken by the user. The user's privacy setting may specify that such voice recording may be used only for voice-input purposes (e.g., to authenticate the user, to send voice messages, to improve voice recognition in order to use voice-operated features of the online social network), and further specify that such voice recording may not be shared with any third-party system or used by other processes or applications associated with the online system 140. As another example and not by way of limitation, the online system 140 may provide a functionality for a user to provide a reference image (e.g., a facial profile) to the online system 140. The online system 140 may compare the reference image against a later-received image input (e.g., to authenticate the user, to tag the user in photos). The user's privacy setting may specify that such voice recording may be used only for a limited purpose (e.g., authentication, tagging the user in photos), and further specify that such voice recording may not be shared with any third-party system or used by other processes or applications associated with the online system 140. Any of such restrictions on capture biometric and/or other personal data may also be applied to the client device 110.

Users may authorize the capture of data, identification of users, and/or sharing and cross-application use of user-related data in one or more ways. For example, user may pre-select various privacy settings before the users use the features of the client devices 110 and/or take actions in the online system 140. In another case, a selection dialogue may be prompted when users first carry out an action or use a feature of the client devices 110 and/or the online system 140 or when users have not carried out the action or used the feature for a predetermined period of time. In yet another example, the client devices 110 and the online system 140 may also provide notifications to the users when certain features that require user data begin to operate or are disabled due to users' selections to allow users to make further selections through the notifications. Other suitable ways for users to make authorizations are also possible.

In some embodiments, the controller 210 obtains information maintained by the online system 140 or from one or more third party systems 130 for a user identified from captured video data, subject to privacy settings for the user. Based on video data, audio data, image data, or other data including the user previously captured by the client device 110 and the obtained information, the controller 210 may generate content for presentation to the user via the client device 110. For example, the controller 210 overlays content items from the online system 140 associated with one or more objects identified by the controller 210 from video data or image data captured by the client device 110. Alternatively, the online system 140 generates content for the user based on video data, image data, audio data, or other data including the user received from the client device 110 and information maintained by the online system 140 for the user (or obtained from one or more third party systems 130 by the online system 140) and provides the generated content to the client device 110 for presentation to the user.

In various embodiments, the client device 110 receives video data from another client device 110, from the online system 140, or from a third party system 130 and displays the video data via the display device 115. Along with displaying the video data, the client device 110 also displays an overlay in a specific area of the display device 115. The overlay includes content other than the video data and at least partially occludes the video data displayed within the specific area of the display device. For example, the overlay presents video data locally captured by the image capture device 117 of the client device 110. To prevent the overlay from occluding a person or an object within the video data likely to be of interest to a user, the controller 210 of the client device 110 identifies coordinates of regions of interest within frames of the video data, as further described below in conjunction with FIG. 4. When the controller 210 determines that at least a threshold amount of a region of interest within the video data is displayed within the specific area of the display device 115, where the overlay is displayed, for at least a threshold amount of time, the controller 210 modifies display of the overlay. For example, the controller 210 increases a transparency of the overlay, as further described below in conjunction with FIGS. 4-5B, to prevent the overlay from occluding a region of interest having at least a threshold amount displayed in the specific area of the display device 115 for at least the threshold amount of time.

Figure 3:
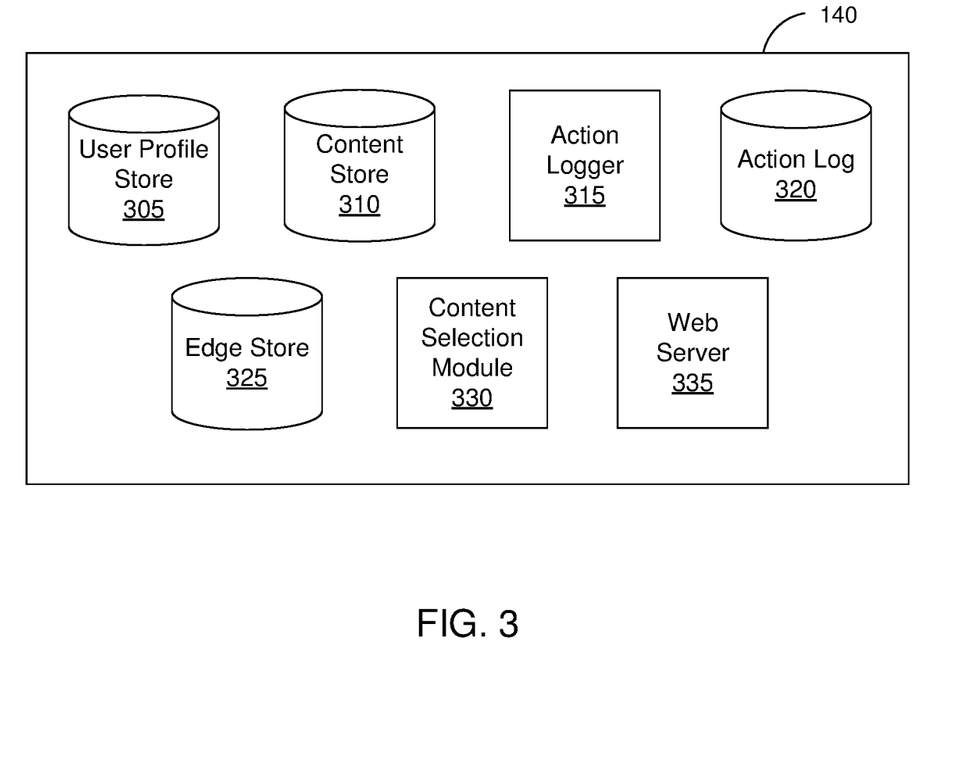
FIG. 3 is a block diagram of an online system, in accordance with an embodiment.

FIG. 3 is a block diagram of an architecture of the online system 140. The online system 140 shown in FIG. 3 includes a user profile store 305, a content store 310, an action logger 315, an action log 320, an edge store 325, a content selection module 330, and a web server 335. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 305. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 305 may also maintain references to actions by the corresponding user performed on content items in the content store 310 and stored in the action log 320.

Additionally, a user profile maintained for a user includes characteristics of one or more client devices 110 associated with the user, allowing the online system 140 to subsequently identify the user from characteristics provided by a client device 110. For example, an application associated with the online system 140 and executing on a client device 110 provides a device identifier or other information uniquely identifying the client device 110 to the online system 140 in association with a user identifier. The online system 110 stores the device identifier or other information uniquely identifying the client device 110 in the user profile maintained for the user, allowing subsequent identification of the user if the online system 140 receives the device identifier or other information uniquely identifying the client device 110. Other characteristics of client devices 110 associated with the user may be alternatively or additionally included in the user profile maintained by the user. For example, the user profile includes a network address used by a client device 110 to access a network 120, an identifier of an application executing on a client device 110 from which the online system 140 received information, a type of the client device 110 (e.g., a manufacturer, an identifier of a model of the client device 110, etc.) from which the online system 140 received information, and an operating system executing on the client device 110 from which the online system 140 received information. However, the online system 140 may store any suitable characteristics of a client device 110 in a user profile, allowing the online system 140 to maintain information about client devices 110 used by the user corresponding to the user profile.

While user profiles in the user profile store 305 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 310 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 310, such as status updates, photos tagged by users to be associated with other objects in the online system 140, events, groups or applications. In some embodiments, objects are received from third-party applications or third-party applications separate from the online system 140. In one embodiment, objects in the content store 310 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

One or more content items included in the content store 310 include a creative, which is content for presentation to a user, and a bid amount. The creative is text, image, audio, video, or any other suitable data presented to a user. In various embodiments, the creative also specifies a page of content. For example, a content item includes a link that specifying a network address of a landing page of content to which a user is directed when the content item is accessed. If a user presented with the content The bid amount is included in a content item by a user and is used to determine an expected value, such as monetary compensation, provided by an advertiser to the online system 140 if content in the content item is presented to a user, if the content in the content item receives a user interaction when presented, or if any suitable condition is satisfied when content in the content item is presented to a user. For example, the bid amount included in a content item specifies a monetary amount that the online system 140 receives from a user who provided the content item to the online system 140 if content in the content item is displayed. In some embodiments, the expected value to the online system 140 of presenting the content from the content item may be determined by multiplying the bid amount by a probability of the content of the content item being accessed by a user.

Various content items may include an objective identifying an interaction that a user associated with a content item desires other users to perform when presented with content included in the content item. Example objectives include: installing an application associated with a content item, indicating a preference for a content item, sharing a content item with other users, interacting with an object associated with a content item, or performing any other suitable interaction. As content from a content item is presented to online system users, the online system 140 logs interactions between users presented with the content item or with objects associated with the content item. Additionally, the online system 140 receives compensation from a user associated with content item as online system users perform interactions with a content item that satisfy the objective included in the content item.

Additionally, a content item may include one or more targeting criteria specified by the user who provided the content item to the online system 140. Targeting criteria included in a content item request specify one or more characteristics of users eligible to be presented with the content item. For example, targeting criteria are used to identify users having user profile information, edges, or actions satisfying at least one of the targeting criteria. Hence, targeting criteria allow a user to identify users having specific characteristics, simplifying subsequent distribution of content to different users.

In one embodiment, targeting criteria may specify actions or types of connections between a user and another user or object of the online system 140. Targeting criteria may also specify interactions between a user and objects performed external to the online system 140, such as on a third party system 130. For example, targeting criteria identifies users that have taken a particular action, such as sent a message to another user, used an application, joined a group, left a group, joined an event, generated an event description, purchased or reviewed a product or service using an online marketplace, requested information from a third party system 130, installed an application, or performed any other suitable action. Including actions in targeting criteria allows users to further refine users eligible to be presented with content items. As another example, targeting criteria identifies users having a connection to another user or object or having a particular type of connection to another user or object.

Based on the privacy settings, the action logger 315 may be authorized to receive communications about user actions internal to and/or external to the online system 140, populating the action log 320 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 320.

Based on the privacy settings, the action log 320 may be authorized by the users to be used by the online system 140 to track user actions on the online system 140, as well as actions on third party systems 130 that communicate information to the online system 140. Users may interact with various objects on the online system 140, and information describing these interactions is stored in the action log 320. Examples of interactions with objects include: commenting on posts, sharing links, checking-in to physical locations via a client device 110, accessing content items, and any other suitable interactions. Additional examples of interactions with objects on the online system 140 that are included in the action log 320 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 320 may record a user's interactions with advertisements on the online system 140 as well as with other applications operating on the online system 140. In some embodiments, data from the action log 320 is used to infer interests or preferences of a user, augmenting the interests included in the user's user profile and allowing a more complete understanding of user preferences.

The action log 320 may also store user actions taken on a third party system 130, such as an external website, and communicated to the online system 140, subject to the privacy settings of the users. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 320 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 315 by the application for recordation and association with the user in the action log 320.

In one embodiment, the edge store 325 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 325 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 325, in one embodiment. Alternatively, each interaction between a user and a specific object is stored as a separate edge. In some embodiments, connections between users may be stored in the user profile store 305, or the user profile store 305 may access the edge store 325 to determine connections between users.

The content selection module 330 selects one or more content items for communication to a client device 110 to be presented to a user. Content items eligible for presentation to the user are retrieved from the content store 310 or from another source by the content selection module 330, which selects one or more of the content items for presentation to the viewing user. A content item eligible for presentation to the user is a content item associated with at least a threshold number of targeting criteria satisfied by characteristics of the user or is a content item that is not associated with targeting criteria. In various embodiments, the content selection module 330 includes content items eligible for presentation to the user in one or more selection processes, which identify a set of content items for presentation to the user. For example, the content selection module 330 determines measures of relevance of various content items to the user based on attributes associated with the user by the online system 140 and based on the user's affinity for different content items. A measure of relevance of a content item to the user is based on a measure of quality of the content item for the user, which may be based on the creative included in the content item as well as content of a landing page identified by a link in the content item. Based on the measures of relevance, the content selection module 330 selects content items for presentation to the user. As an additional example, the content selection module 330 selects content items having the highest measures of relevance or having at least a threshold measure of relevance for presentation to the user. Alternatively, the content selection module 330 ranks content items based on their associated measures of relevance and selects content items having the highest positions in the ranking or having at least a threshold position in the ranking for presentation to the user.

Content items eligible for presentation to the user may include content items associated with bid amounts. The content selection module 330 uses the bid amounts associated with content items when selecting content for presentation to the user. In various embodiments, the content selection module 330 determines an expected value associated with various content items based on their bid amounts and selects content items associated with a maximum expected value or associated with at least a threshold expected value for presentation. An expected value associated with a content item represents an expected amount of compensation to the online system 140 for presenting the content item. For example, the expected value associated with a content item is a product of the content item's bid amount and a likelihood of the user interacting with the content item. The content selection module 330 may rank content items based on their associated bid amounts and select content items having at least a threshold position in the ranking for presentation to the user. In some embodiments, the content selection module 330 ranks both content items not associated with bid amounts and content items associated with bid amounts in a unified ranking based on bid amounts and measures of relevance associated with content items. Based on the unified ranking, the content selection module 330 selects content for presentation to the user. Selecting content items associated with bid amounts and content items not associated with bid amounts through a unified ranking is further described in U.S. patent application Ser. No. 13/545,266, filed on Jul. 10, 2012, which is hereby incorporated by reference in its entirety.

For example, the content selection module 330 receives a request to present a feed of content to a user of the online system 140. The feed includes content items such as stories describing actions associated with other online system users connected to the user. The content selection module 330 accesses one or more of the user profile store 305, the content store 310, the action log 320, and the edge store 325 to retrieve information about the user. For example, information describing actions associated with other users connected to the user or other data associated with users connected to the user are retrieved. Content items from the content store 310 are retrieved and analyzed by the content selection module 330 to identify candidate content items eligible for presentation to the user. For example, content items associated with users who not connected to the user or stories associated with users for whom the user has less than a threshold affinity are discarded as candidate content items. Based on various criteria, the content selection module 330 selects one or more of the content items identified as candidate content items for presentation to the identified user. The selected content items are included in a feed of content that is presented to the user. For example, the feed of content includes at least a threshold number of content items describing actions associated with users connected to the user via the online system 140.

In various embodiments, the content selection module 330 presents content to a user through a feed including a plurality of content items selected for presentation to the user. The content selection module 330 may also determine the order in which selected content items are presented via the feed. For example, the content selection module 330 orders content items in the feed based on likelihoods of the user interacting with various content items.

Based on a user's action or consent, the content selection module 330 receives video data captured by an image capture device 117 included in a client device 110 associated with the user of the online system and transmits the video data to a receiving client device 110 for presentation to a viewing user via a display device 115. The online system 140 may receive a request from the client device 110 that identifies the viewing user, and subsequently provides video data from the client device 110 to the receiving client device 110 in response to receiving an authorization from the viewing user. Conversely, the online system 140 receives a request from the viewing user via the receiving client device 110 and subsequently provides video data received from the client device 110 to the receiving client device 110 in response to receiving an authorization from the user. This allows different users of the online system 140 to exchange video data captured by client devices 110 associated with the users via the online system 140.

Additionally, the content selection module 330 may receive instructions from the viewing user via the receiving client device 110 and transmits one or more of the instructions to the client device 110. Based on the received instruction, the client device 110 modifies video data captured after receiving the instructions or modifies one or more parameters of the image capture device 117 based on the instructions. Hence, the client device 110 modifies captured video data based on the one or more instructions from the receiving client device 110 and transmits the modified video data, or the video data captured by the image capture device 117 using the modified parameters, to the content selection module 330, which transmits the video data to the receiving client device 110, as further described below in conjunction with FIG. 4. This allows the viewing user to modify or adjust the video data captured by the client device 110 and provided to the viewing user via the receiving client device 110.

The content selection module 330 enforces one or more privacy settings of the users of the online system 140 in various embodiments. A privacy setting of a user determines how particular information associated with a user can be shared, and may be stored in the user profile of a user in the user profile store 305. In one embodiment, a privacy setting specifies particular information associated with a user and identifies other entities with whom the specified information may be shared. Examples of entities with which information can be shared may include other users, applications, third party systems 130 or any entity that can potentially access the information. Examples of information that can be shared by a user include user profile information like profile photo, phone numbers associated with the user, user's connections video data including the user, actions taken by the user such as adding a connection, changing user profile information and the like. In various embodiments, the online system 140 maintains privacy settings associated with a user having a default setting preventing other entities from accessing or receiving content associated with the user, and allows the user to modify different privacy settings to allow other entities that are specified by the user to access or to retrieve content corresponding to the modified privacy settings.

The privacy setting specification may be provided at different levels of granularity. In one embodiment, a privacy setting may identify specific information to be shared with other users. For example, the privacy setting identifies a work phone number or a specific set of related information, such as, personal information including profile photo, home phone number, and status. Alternatively, the privacy setting may apply to all the information associated with the user. Specification of the set of entities that can access particular information may also be specified at various levels of granularity. Various sets of entities with which information can be shared may include, for example, all users connected to the user, a set of users connected to the user, additional users connected to users connected to the user all applications, all third party systems 130, specific third party systems 130, or all external systems.

One embodiment uses an enumeration of entities to specify the entities allowed to access identified information or to identify types of information presented to different entities. For example, the user may specify types of actions that are communicated to other users or communicated to a specified group of users. Alternatively, the user may specify types of actions or other information that is not published or presented to other users.

The content selection module 330 includes logic to determine if certain information associated with a user can be accessed by other users connected to the user via the online system 140, third-party system 130 and/or other applications and entities. Based on the user's privacy settings, the content selection module 330 determines if another user, a third-party system 130, an application or another entity is allowed to access information associated with the user, including information about actions taken by the user. For example, the content section module 230 uses a user's privacy setting to determine if video data including the user may be presented to another user. This enables a user's privacy setting to specify which other users, or other entities, are allowed to receive data about the user's actions or other data associated with the user.

The web server 335 links the online system 140 via the network 120 to the one or more client devices 110, as well as to the one or more third party systems 130. The web server 335 serves web pages, as well as other content, such as JAVA®, FLASH®, XML and so forth. The web server 335 may receive and route messages between the online system 140 and the client device 110, for example, instant messages, queued messages (e.g., email), text messages, short message service (SMS) messages, or messages sent using any other suitable messaging technique. A user may send a request to the web server 335 to upload information (e.g., images or videos) that are stored in the content store 310. Additionally, the web server 335 may provide application programming interface (API) functionality to send data directly to native client device operating systems, such as IOS®, ANDROID™, or BlackberryOS.

Figure 4:
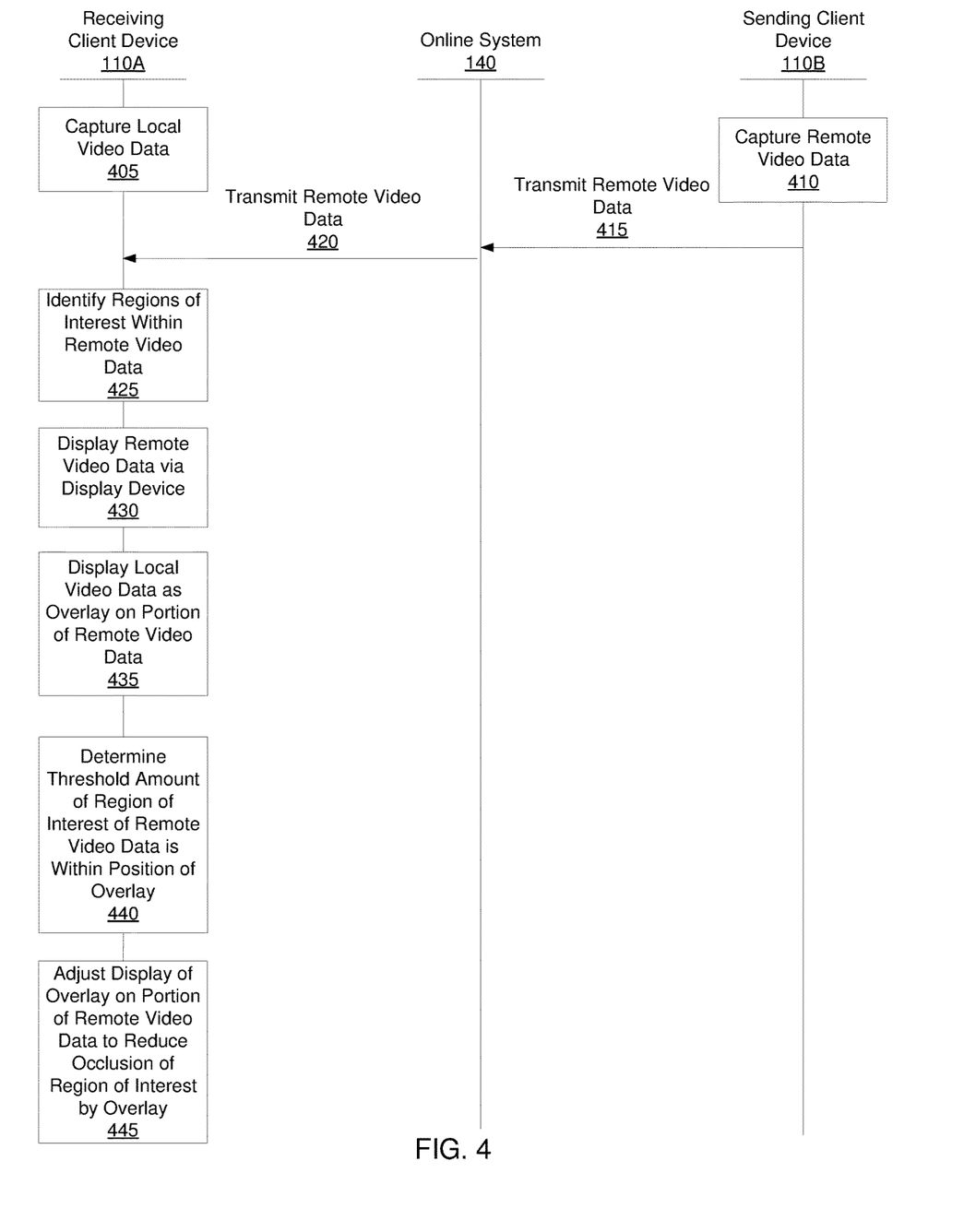
FIG. 4 is an interaction diagram of a method for modifying display of an overlay by a receiving client device over a portion of remote video data received by the receiving client device based on regions of interest within the remote video data, in accordance with an embodiment.

Repositioning an Overlay Displayed on Video Data Based on Regions of Interest within the Video Data FIG. 4 is an interaction diagram of one embodiment of a method for modifying display of an overlay by receiving client device 110A over a portion of remote video data received from a sending client device 110B based on regions of interest within the remote video data. In various embodiments, the steps described in conjunction with FIG. 4 may be performed in different orders. Additionally, in some embodiments, the method may include different and/or additional steps than those shown in FIG. 4.

An image capture device 117 included in a receiving client device 110A, as further described above in conjunction with FIGS. 1 and 2, captures 405 local video data of a local area surrounding the receiving client device 110A. Images captured by the image capture device 117 are communicated to a controller 210 included in the receiving client device 110A (or coupled to the receiving client device 110A in other embodiments). In various embodiments, a user may authorize (e.g., through pre-selected privacy settings and/or prompted selections) the controller 210 to apply one or more machine learned models to characteristics of the local video captured 405 by the image capture device 117 of the receiving client device 110A to locate people or other objects included in the local video data.

Similarly, an image capture device 117 included in a sending client device 110B, as further described above in conjunction with FIGS. 1 and 2, captures 410 remote video data of an area surrounding the sending client device 110B. The sending client device 110B is in a different physical location than the receiving client device 110A. Images of the remote area captured by the image capture device 117 are communicated to a controller 210 included in the receiving client device 110A (or coupled to the receiving client device 110A in other embodiments). In various embodiments, a remote user may authorize (e.g., through pre-selected privacy settings and/or prompted selections) the controller 210 of the sending client device 110B to apply one or more machine learned models to characteristics of the local video captured 410 by the image capture device 117 of the sending client device 110B to locate people or other objects included in the local video data.

The sending client device 110B transmits 415 the captured remote video data to an online system 140, which transmits 420 the remote video data to the receiving client device 110A. For example, the sending client device 110B receives a request to exchange video data from the receiving client device 110A (via the online system 140 or via another source), and transmits 415 the remote video data to the online system 140 along with an identifier of the receiving client device 110A (or to the receiving client device 110A), and the online system 140 transmits 420 the remote video data to the receiving client device 110A using the received identifier of the sending client device 110A. As another example, the sending client device 110B transmits a request to exchange video data to the receiving client device 110A via the online system 140 or via another communication channel; in response to receiving an authorization from the receiving client device 110A in response to the request, the sending client device 110B transmits 415 the remote video data to the online system 140 (or to the receiving client device 110A). In various embodiments, the receiving client device 110A also transmits the captured local video data to the sending client device 110B via the online system 140 or via another communication channel, so the receiving client device 110A and the sending client device 110B exchange captured video data with each other (e.g., through a video call or video messaging session).

The receiving client device 110A identifies 425 one or more regions of interest within the remote video data received from the sending client device 110B. In various embodiments, the controller 210 of the sending client device 110B applies one or more methods to locate people within the remote video data and identifies regions of interest of the remote video data as coordinates within frames of the remote video data including a person. However, the sending client device 110B may similarly locate objects (e.g., appliances, furniture, products) by applying one or more models to the remote video data and identify regions of interest of the remote video data as coordinates within frames of the remote video data including an object. The sending device 110B associates metadata with the remote video data identifying coordinates of the one or more regions of interest within frames of the remote video data and transmits the metadata to the receiving client device 110A along with the remote video data, so the receiving client device 110A identifies 425 regions of interest within the remote video data based on the coordinates identified by the metadata received from the sending client device 110B in association with the remote video data. In various embodiments, the metadata identifies a bounding box that surrounds each object or person identified in the remote video data by the controller 210 of the sending client device 110B. For example, the metadata associated with the remote video data by the sending client device 110B includes coordinates within frames of the video data specifying a bounding box including a person or another object identified within frames of the remote video data.

In various embodiments, the controller 210 of the sending client device 110B applies one or more models identifying a foreground portion of frames of the remote video data and a background portion of frames of the remote video data. The model applied by the controller 210 of the sending client device 110B may identify the foreground portion and the background portion based on changes in different regions of the remote video data over time, so regions of the remote video data having less than a threshold amount of change over at least a threshold number of consecutive pixels are identified as background portions of the remote video data. For example, the model identifies the background portion of the remote video data as areas of the remote video data including static objects, while the foreground portion includes regions of the remote video data includes moving objects, such as people, or otherwise include pixels having attributes that change at least a threshold amount between consecutive frames of the remote video data. Thus, the model applied by the sending client device 110B differentiates between background objects (e.g., furniture, walls, bookshelves, tables, chairs, carpeting, ceilings, chandeliers, and other objects in the area surrounding the sending client device 110B that do not move moving) in the area for which the image capture device 117 of the sending client device 110B captures 410 video data and objects, such as people, within the area for which the image capture device 117 of the sending client device 110B captures 410 video data that move over time. In various embodiments, a model applied to the remote video data by the controller 210 of the sending client device 110B is generated using periodic color and pixel information for consecutive frames in the remote video data to determine portions of the remote video data that are background and portions of the remote video data that are foreground. If pixels of the remote video data periodically move (e.g., change color or intensity) between consecutive frames of the remote video data, the controller 210 of the sending client device 110B identifies those pixels as a foreground portion of the captured video data. However, if pixels of the remote video data remain unchanged for a threshold period of time or for a threshold number of consecutive frames of the remote video data, the pixels are identified as a background portion of the remote video data.

Hence, the sending client device 110B applies a model that differentiates a foreground portion of the remote video data from a background portion of the remote data based on differences in pixels having corresponding locations in consecutive frames of the remote video data. In some embodiments, the model labels regions of the remote video data corresponding to pixels in different locations within a frame of the remote video data as a background portion or as a foreground portion. Alternatively, the model labels regions of the remote video data corresponding to pixels in different locations within a frame of the remote video data as a background portion, and does not label regions of the remote video data corresponding to foreground portions (or vice versa).

In some embodiments, the controller 210 of the sending client device 110B records color values for pixels associated with background portions of the remote video data and labels the recorded color values for the pixels associated with a background portion as background. The controller 210 of the sending client device 110B may also obtain depth information in various embodiments, so each pixel has a depth value as well as corresponding color values. The controller 210 of the sending client device 110B may use depth values for different pixels when identifying the background portion or the foreground portion of the remote video data, as pixels with smaller depth values are more likely to be a foreground portion, while pixels with larger depth values are more likely to be a background portion.

The model applied by the controller 210 of the sending client device 110B, or an additional model applied by the controller 210 of the sending client device 110B identifies regions of interest within frames of the remote video data that include people (or other objects). For example, the controller 210 of the sending client device 110B applies one or more models performing two- or three-dimensional pose tracking to the remote video data, allowing the sending client device 110B to identify regions of interest of the remote video data that include a person, or other object, based on the pose tracking. In various embodiments, the controller 210 of the sending client device 110B identifies regions of interest within frames of the remote video by generating a bounding box that surrounds two- or three-dimensional pose data for each person, or other object, so a bounding box identifies a region of interest of the remote video data. The controller 210 of the sending client device 110B generates metadata identifying coordinates within frames of the remote video data specifying boundaries of each bounding box that is associated with the remote video data in some embodiments.

For example, the controller 210 of the sending client device 110B performs facial tracking (in two-dimensions or in three-dimensions), two-dimensional pose tracking, three-dimensional pose tracking, or any other suitable method to identify portions of a person's face or portions of the person's body as regions of interest within the remote video data. The controller 210 of the sending client device 110B identifies regions of the remote video data including people (or other objects) as regions of interest and stores metadata in association with the remote video data specifying locations within the remote video data corresponding to the identified regions of interest. For example, the controller 210 of the sending client device 110B stores coordinates within frames of the remote video data specifying a bounding box identified as including a person (or another object}, so the bounding box specifies the region of interest of the remote video data. The sending client device 110B transmits the metadata identifying the regions of interest within the remote video data to the receiving client device 110A in association with the remote video data.

When the receiving client device 110A receives metadata associated with the remote video data identifying regions of interest within the remote video data from the sending client device 110B, the receiving client device 110A identifies 425 regions of interest within the remote video data from the coordinates of bounding boxes included in the metadata associated with the remote video data. Alternatively, the receiving client device 110A applies the one or more models described above in conjunction with the sending client device 110B to the remote video data from the sending client device 110B. Hence, the receiving client device 110A may identify regions of interest within the remote video data after receiving the remote video data. As further described above, the receiving client device 110A determines coordinates within frames of the remote video data of bounding boxes that correspond to regions of interest within the remote video data.

The receiving client device 110A displays 430 the remote video data via a display device 115 of the receiving client device 110A and displays 435 the local video as an overlay on the remote video data. The overlay is displayed 435 in a specific area of the display device 115 of the receiving client device 110A and at least partially occludes the remote video data being displayed 430 in the specific area of the display device 115 of the receiving client device 110A. For example, the overlay is a rectangle including the local video data that the receiving client device 110A displays 435 at specific coordinates of the display device 115 (e.g., in an upper right corner of the display device 115) over the remote video data.

Because the overlay at least partially occludes remote video data displayed in the specific area of the display device 115 where the overlay is displayed 435, people or objects moving in the captured video data may be obscured when they move to be displayed 430 in the specific area of the display device 115 in which the overlay is displayed 435. To prevent the overlay from occluding objects or people in the remote video data identified 425 as regions of interest, the receiving client device 110A determines whether a threshold amount of a region of interest identified 425 within the remote video data is within the specific area of the display device 115 in which the overlay is displayed 435 for at least a threshold amount of time. For example, the receiving client device 110A determines whether a threshold percentage of a region of interest identified 425 within the remote video data is displayed 430 in the specific area of the display device 115 in which the overlay is displayed 435 for at least the threshold amount of time. In an embodiment, the controller 210 of the receiving client device 110A determines coordinates within the display device 115 of a region of interest within the remote video data and compares the coordinates of the region of interest within the display device 115 to coordinates of the specific area of the display device 115 displaying the overlay. Based on the comparison, the controller 210 determines an amount of the region of interest that is displayed 430 in the specific area of the display device 115 displaying 435 the local video data. For example, the controller 210 determines coordinates within the display device 115 of a bounding box corresponding to a region of interest of the remote video data determines 440 that a threshold amount of the bounding box is displayed 430 within the specific area of the display device 115 from the coordinates of the bounding box and the coordinates within the display device 115 of the specific area displaying 435 the overlay.

In response to determining 440 at least the threshold amount of the region of interest identified 425 within the remote video data is displayed 430 in the specific area of the display device 115 displaying 435 the overlay for at least the threshold amount of time, the controller 210 of the receiving client device 110A adjusts 445 display of the overlay to reduce occlusion of the region of interest in the remote video data displayed 430 in the portion of the remote video data. For example, the controller 210 increases a transparency of the overlay in response to determining 440 at least the threshold amount of the region of interest identified 425 within the remote video data is displayed 430 in the specific area of the display device 115 displaying 435 the overlay for at least the threshold amount of time. Increasing the transparency of the overlay reduces obstruction of the portion of the remote video data by the overlay, allowing a user of the receiving client device 110A to more clearly view the remote video data displayed 430 in the specific area of the display device 115 including the overlay. In some embodiments, the controller 210 of the receiving client device 110A increases the transparency of the overlay by a specific amount. For example, the controller 210 increases the transparency of the overlay by a specific percentage in response to determining 440 at least the threshold amount of the region of interest identified 425 within the remote video data is displayed 430 in the specific area of the display device 115 displaying 435 the overlay for at least the threshold amount of time. In another embodiment, the controller 210 increases the transparency of the overlay by an amount that is directly related to an amount of the region of interest displayed 430 in the specific area of the display device 115. For example, the controller 210 increases the transparency of the overly by a percentage that is directly related (e.g., directly proportional) to a percentage of the region of interest that is displayed 430 in the specific area of the display device 115 displaying 435 the overlay; hence, the overlay becomes increasingly transparent as a greater amount of the region of interest is displayed 430 in the specific area of the display device 115 where the overlay is displayed 435. In other embodiments, the controller 210 increases the transparency of the overlay by an amount that is directly related to an amount of time that the region of interest is displayed 430 in the specific area of the display device 115. Hence, in the preceding example, the transparency of the overlay increases as a length of time that region of interest within the remote video data is displayed 430 in the specific area of the display device 115 where the overlay is displayed 435 increases.

In various embodiments, the threshold amount of the region of interest is determined based on a type of the region of interest. For example, when identifying 425 regions of interest within the remote video data, a type corresponding to a region of interest is stored in association with the region of interest; example types of a region of interest include a person, a body, a face, an animal, an object, or any other information. The receiving client device 110A associates different threshold amounts with different types of regions of interest. For example, a smaller threshold amount is associated with a region of interest identified as a face than a threshold amount associated with a region of interest identified as an object. In the preceding example, the controller 210 of the receiving client device 110A increases the transparency of the overlay when a smaller amount of a region of interest identified as a face is displayed 430 in the specific area of the display device 115 where the overlay is displayed 435 than when a region of interest identified as an object is displayed 435 in the specific area of the display device 115 where the overlay is displayed 430. Threshold amounts associated with different types of regions of interest may be specified by a user of the receiving client device 110A and stored in the receiving client device 110A or stored in a user profile for the user maintained by the online system 140 and retrieved from the online system 140 by the receiving client device 110A. Alternatively, the controller 210 or the online system 140 determines threshold amounts associated with different types of regions of interest.

Alternatively, to adjust 445 display of the overlay to reduce occlusion of the region of interest in the remote video data displayed 430 in the portion of the remote video data via the display device in response to determining 440 at least the threshold amount of the region of interest identified 425 within the remote video data is displayed 430 in the specific area of the display device 115 displaying 435 the overlay for at least the threshold amount of time, the controller 210 of the receiving client device 110A displays the overlay in an alternative position of the display device 115. For example, the controller 210 of the receiving client device 110A identifies 425 regions of interest within the remote video data and determines a portion of the remote video data that does not include a region of interest. The controller 210 of the receiving client device 110A repositions the overlay to be displayed in coordinates of the display device 115 corresponding to the determined portion of the remote video data. Hence, the controller 210 repositions display of the overlay to coordinates of the display device 115 in which a region of interest of the remote video data is not displayed 430.

In other embodiments, the, the controller 210 of the receiving client device 110A resizes the overlay to adjust 445 display of the overlay to reduce occlusion of the region of interest in the remote video data displayed 430 in the portion of the remote video data via the display device in response to determining 440 at least the threshold amount of the region of interest identified 425 within the remote video data is displayed 430 in the specific area of the display device 115 displaying 435 the overlay for at least the threshold amount of time. For example, the controller 210 decreases a size of the overlay in response to determining 440 at least the threshold amount of the region of interest identified 425 within the remote video data is displayed 430 in the specific area of the display device 115 displaying 435 the overlay for at least the threshold amount of time. Decreasing the size of the overlay reduces obstruction of the portion of the remote video data by the overlay, allowing a user of the receiving client device 110A to more clearly view the remote video data displayed 430 in the specific area of the display device 115 including the overlay. In some embodiments, the controller 210 of the receiving client device 110A decreases the size of the overlay by a specific amount. For example, the controller 210 decreases the size of the overlay by a specific percentage in response to determining 440 at least the threshold amount of the region of interest identified 425 within the remote video data is displayed 430 in the specific area of the display device 115 displaying 435 the overlay for at least the threshold amount of time. In another embodiment, the controller 210 decreases the size of the overlay by an amount that is directly related to an amount of the region of interest displayed 430 in the specific area of the display device 115. For example, the controller 210 decreases the size of the overly by a percentage that is directly related (e.g., directly proportional) to a percentage of the region of interest that is displayed 430 in the specific area of the display device 115 displaying 435 the overlay; hence, the overlay becomes increasingly smaller as a greater amount of the region of interest is displayed 430 in the specific area of the display device 115 where the overlay is displayed 435. In other embodiments, the controller 210 decreases the size of the overlay by an amount that is directly related to an amount of time that the region of interest is displayed 430 in the specific area of the display device 115. Hence, in the preceding example, the size of the overlay decreases as a length of time that region of interest within the remote video data is displayed 430 in the specific area of the display device 115 where the overlay is displayed 435 increases. The size of the overlay is increased when less than the threshold amount of the region of interest identified 425 within the remote video data is displayed 430 in the specific area of the display device 115 displaying 435 the overlay.

In some embodiments, the controller 210 of the receiving client device 110A receives a selection of a specific region of interest from a user. The controller 210 adjusts 445 display of the overlay to reduce occlusion of the region of interest in the remote video data displayed 430 in the portion of the remote video data via the display device 115 in response to determining 440 the threshold amount of the specific region of interest within the remote video data is displayed 430 in the specific area of the display device 115 displaying 435 the overlay for at least the threshold amount of time, as further described above. However, the controller 210 does not modify display of the overlay in response to determining 440 the threshold amount of other regions of interest within the remote video data are displayed 430 in the specific area of the display device 115 displaying 435 the overlay for at least the threshold amount of time. Such an embodiment allows the user of the receiving client device 110 to select a specific region of interest within the remote video data that causes the controller 210 to alter presentation of the overlay, while other regions of interest within the remote video data to not affect display 430 of the overlay.

While displaying the remote video data with display of the overlay adjusted 445 to reduce occlusion of the region of interest in the remote video data displayed 430 in the portion of the remote video data, the controller 210 of the receiving client device 110A periodically (or continuously) determines the amount of the region of interest in the specific area of the display device 115 in which the overlay was originally displayed 435. In response to determining that the threshold amount of the region of interest within the remote video data is no longer within the specific area of the display device 115 where the overlay was originally displayed 435, the controller 210 of the receiving client device 110A resumes displaying 435 the overlay in the specific area of the display device 110 with a level of occlusion of the remote video data displayed in the specific area of the display device 115 prior to the adjustment 445 of the display of the overlay. For example, the controller 210 decreases the transparency of the overlay as the amount of the region of interest displayed 430 within the specific area decreases. The amount by which the controller 210 decreases the transparency of the overly may decrease by an amount that is directly related to the amount of the region of interest displayed 430 within the specific area of the display device 115. Alternatively, the transparency of the overlay is decreased by a specific amount in response to determining less than the threshold amount of the region of interest is displayed 430 within the specific area of the display device 115. If the overlay is displayed in an alternative position of the display device 115, the controller 210 of the receiving client device 110A repositions the overlay to the specific area in response to determining less than the threshold amount of the region of interest is displayed 430 within the specific area of the display device 115.

While FIG. 4 describes modifying display of an overlay in which local video data is displayed 435 on a display device 115 of the receiving client device 110A that at least partially obscured, or occluded, remote video data displayed 430 by the display device 115, the method described in conjunction with FIG. 4 may be used to modify display of any type of overlay on video data that at least partially occludes a portion of the video data. Examples of such an overlay include a graphic, a notification message, a reminder, a logo, an icon, or any other suitable display element. If a client device 110 displays received video data via a display device 115 and concurrently displays an overlay in a specific area of the display device 115 that at least partially occludes a portion of the video data, the client device 110 identifies 425 regions of interest within the video data, as further described above, and adjusts 445 display of the overlay to reduce occlusion of the region of interest in the remote video data displayed 430 in the portion of the remote video data via the display device 115 in response to determining that at least a threshold amount of a region of interest of the video data is displayed in the specific area of the display device 115 for at least a threshold amount of time. As further described above, the controller 210 of the client device 110 increases a transparency of the overlay when the threshold amount of a region of interest of the video data is displayed in the specific area of the display device 115 for at least a threshold amount of time, so the video data is more visible in the specific area of the display device 115. In another example, the client device 110 repositions the overlay to be displayed in an alternative area of the display device 115 that does not include a region of interest of the video data. As further described above, when the controller 210 of the client device 110 determines that less than the threshold amount of the region of interest of the video data is displayed in the specific area of the display device 115, the client device 110 resumes displaying the overlay in the specific area of the display device.

Figure 5A:
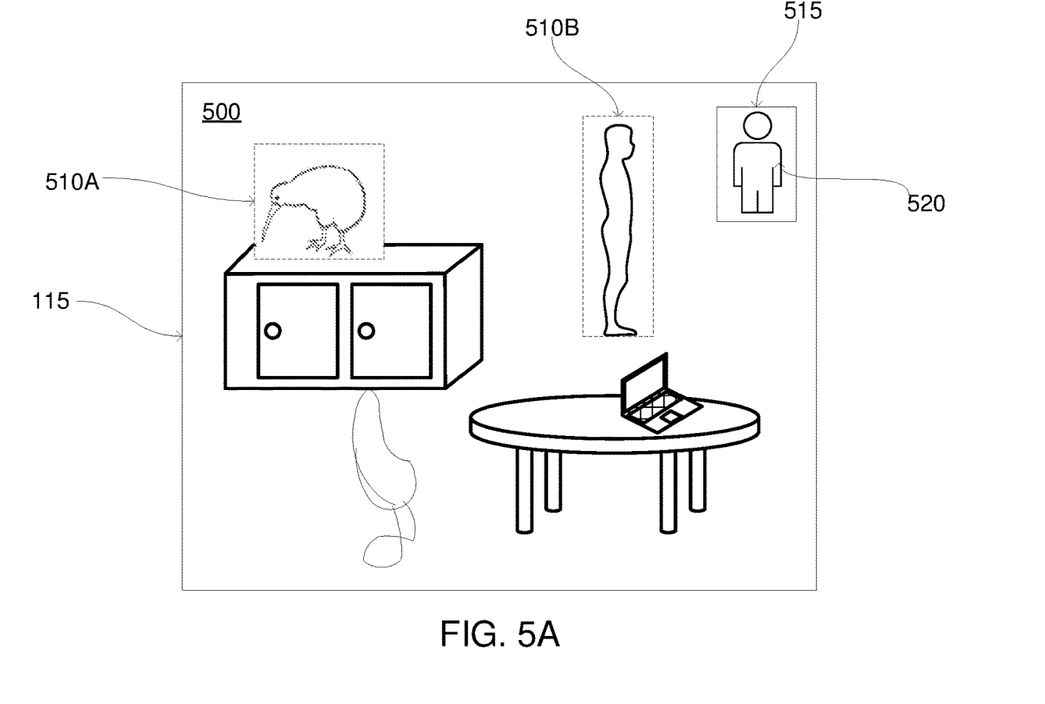
FIGS. 5A and 5B are an example of a client device modifying display of an overlay over a portion of video data displayed by the client device based on regions of interest within the video data, in accordance with an embodiment.
Figure 5B:
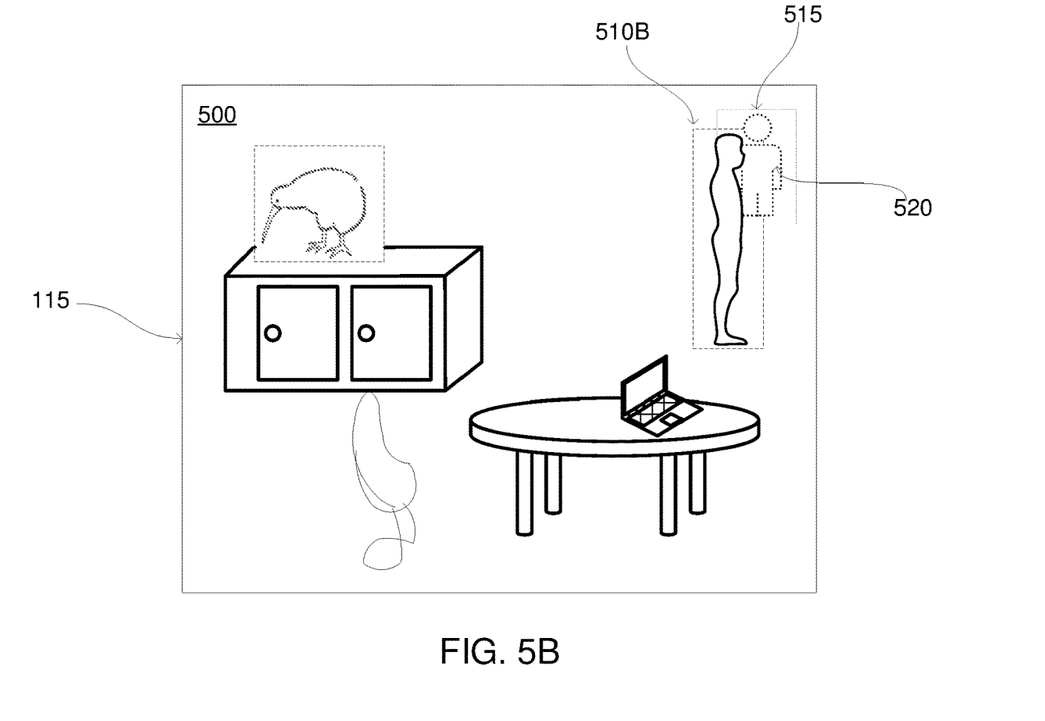

FIGS. 5A and 5B are an example of a client device 110 modifying display of an overlay over a portion of video data displayed by the client device 110 based on regions of interest within the video data. FIG. 5A shows a display device 115 of a client device 110 displaying video data 500. For example, the video data 500 is video data captured by another client device 110 and received by the client device 110. As other examples, the video data 500 is received by the client device 110 from an online system 140, from a third party system 130, or from another source.

As further described above in conjunction with FIG. 4, the client device 110 identifies regions of interest within the video data 500. For example, regions of interest correspond to locations within frames of the video data 500 including moving objects, such as people, animals, or vehicles. In the example of FIG. 5, the client device 110 identified region of interest 510A and region of interest 510B in the video data 500. In various embodiments, such as the one shown in FIG. 5, the client device 110 identifies region of interest 510A as a bounding box enclosing an object in the video data 500 and identifies region of interest 510B as a bounding box enclosing another object in the video data 500. As further described above in conjunction with FIG. 5, the client device 110 may receive metadata along with the video data, with the metadata specifying coordinates within frames of the video data 500 corresponding to region of interest 510A and region of interest 510B. Alternatively, the client device 110 applies one or more models to the video data 500 to identify coordinates of region of interest 510A and of region of interest 510B in the video data, as further described above in conjunction with FIG. 4.

The client device 110 displays an overlay 515 in a specific area of the display device 115 that at least partially occludes video data 500 displayed in the specific area of the display device 115. In the example of FIGS. 5A and 5B, the overlay 515 displays local video data 520 locally captured by the client device 110. However, in other embodiments, the overlay 515 may display any suitable information that at least partially occludes video data 500 presented in the specific area of the display device 115 where the overlay 515 is displayed. Hence, if region of interest 510A or region of interest 510B are displayed at coordinates of the display device 115 corresponding to the specific area where the overlay 515 is displayed, the overlay 515 at least partially occludes region of interest 510A or region of interest 510B, which may obscure content of the video data 500 relevant to a user of the client device 110.

To prevent display of the overlay 515 from occluding a region of interest 510A, 510B identified in the video data 500, the client device 110 determines whether at least a threshold amount of a region of interest 510A, 510B within the video data 500 is displayed within the specific area of the display device 115 displaying the overlay 515 for at least a threshold amount of time. In the example of FIG. 5B, the client device 110 determines that region of interest 510B is displayed within the specific area of the display device 115 where the overlay 515 is displayed for at least a threshold amount of time. In response to determining that region of interest 510B is displayed within the specific area of the display device 115 where the overlay 515 is displayed for at least a threshold amount of time, the client device 110 modifies display of the overlay 515, so the overlay 515 does not partially obscure the video data 500 displayed in the specific area of the display device 115, where region of interest 510B is displayed, as further described above in conjunction with FIG. 4. In the example of FIG. 5, the client device 110 increases a transparency of the overlay 515 (including the local video data 520 displayed via the overlay 515), so the overlay 515 does not obscure region of interest 510B in FIG. 5B. As further described above in conjunction with FIG. 4, the client device 110 may increase a transparency of the overlay 515 by an amount (e.g., a percentage) that is directly related to an amount (e.g., a percentage) of region of interest 510B displayed within the specific area of the display device 115 or may increase the transparency of the overlay 515 by a specific amount in response to determining the threshold amount of region of interest 510B is displayed within the specific area for at least the threshold amount of time. When the threshold amount of region of interest 510B is no longer displayed in the specific area, the client device 110 decreases the transparency of the overlay 515, so the display device 115 displays the video data 500 and the overlay 515 as shown in FIG. 5A. In some embodiments, the client device 110 decreases the transparency of the overlay 515 in response to less than the threshold amount of region of interest 510B being displayed within the specific area for a specific time interval; in some embodiments, the specific time interval is the same as the threshold amount of time, while in other embodiments, the specific dime interval is different than the threshold amount of time.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   capturing local video data of a local area within a field of view of an image capture device included in a receiving client device;
   receiving, at the receiving client device, remote video data of an area within a field of view of a remote image capture device included in a sending client device;
   identifying coordinates within the remote video data of one or more regions of interest within the remote video data;
   displaying the remote video data on a display device of the receiving client device;
   displaying the local video data as an overlay on the remote video data, the overlay displayed in a specific area of the display device of the receiving client device and at least partially occluding remote video data displayed in the specific area of the display device;
   determining, by the receiving client device, that a threshold amount of a region of interest within the remote video data is within the specific area of the display device displaying the overlay for at least a threshold amount of time;
   in response to the determining:
      adjusting, by the receiving client device, the display of the overlay to reduce the occlusion of the region of interest displayed in the specific area of the display device by the overlay.

2. The method of claim 1, wherein identifying coordinates within the remote video data of regions of interest within the remote video data comprises:
   receiving metadata associated with the remote video data from the sending client device, the metadata identifying coordinates of the one or more regions of interest within frames of the remote video data.

3. The method of claim 2, wherein the metadata includes a bounding box corresponding to each region of interest.

4. The method of claim 3, wherein determining, by the receiving client device, that the threshold amount of the region of interest within the remote video data is within the specific area of the display device displaying the overlay for at least the threshold amount of time comprises:
   determining a threshold amount of a bounding box corresponding to the region of interest is within the specific area of the display device displaying the overlay for at least the threshold amount of time.

5. The method of claim 1, wherein identifying coordinates within the remote video data of regions of interest within the remote video data comprises:
   applying one or more models maintained by the local client device to characteristics of the received remote video data that identify the regions of interest within the remote video data.

6. The method of claim 5, wherein application of the one or more models generates a bounding box corresponding to each region of interest.

7. The method of claim 6, wherein determining, by the receiving client device, that the threshold amount of the region of interest within the remote video data is within the specific area of the display device displaying the overlay for at least the threshold amount of time comprises:
   determining a threshold amount of a bounding box corresponding to the region of interest is within the specific area of the display device displaying the overlay for at least the threshold amount of time.

8. The method of claim 1, wherein adjusting, by the receiving client device, the display of the overlay to reduce the occlusion of the region of interest displayed in the specific area of the display device by the overlay comprises:
   increasing a transparency of the overlay displaying the local video data.

9. The method of claim 8, wherein the transparency of the overlay displaying the local video data is increased by an amount that is directly related to an amount of the region of interest within the remote video data within the specific area of the display device displaying the overlay.

10. The method of claim 8, wherein the transparency of the overlay displaying the local video data is increased by an amount that is directly related to an amount of time at least the threshold amount of the region of interest within the remote video data is within the specific area of the display device displaying the overlay.

11. The method of claim 8, wherein the transparency of the overlay displaying the local video data is increased by a specific amount.

12. The method of claim 8, further comprising:
   responsive to determining the threshold amount of the region of interest within the remote video data is no longer within the specific area of the display device displaying the overlay, displaying the local video data as the overlay on the remote video data in the specific area of the display device and at least partially occluding remote video data displayed in the specific area of the display device.

13. The method of claim 1, wherein adjusting the display of the overlay to reduce the occlusion of the region of interest displayed in the specific area of the display device by the overlay comprises:
   identifying a portion of the remote video data that does not include at least one region of interest;
   displaying the overlay in an alternative position of the display device corresponding to a portion of the display device displaying the identified portion of the remote video data.

14. A method comprising:
   receiving, at a receiving client device, remote video data of an area within a field of view of a remote image capture device included in a sending client device;
   identifying coordinates within the remote video data of one or more regions of interest within the remote video data;
   displaying the remote video data on a display device of the receiving client device;
   displaying an overlay on the remote video data, the overlay displayed in a specific area of the display device, including content other than the remote video data, and at least partially occluding remote video data displayed in the specific area of the display device;
   determining, by the receiving client device, that a threshold amount of a region of interest within the remote video data is within the specific area of the display device displaying the overlay for at least a threshold amount of time;

in response to the determining:

adjusting, by the receiving client device, the display of the overlay to reduce the occlusion of the region of interest displayed in the specific area of the display device by the overlay.

15. The method of claim 14, wherein adjusting, by the receiving client device, the display of the overlay to reduce the occlusion of the region of interest displayed in the specific area of the display device by the overlay comprises:

increasing a transparency of the overlay.

16. The method of claim 15, wherein the transparency of the overlay is increased by an amount that is directly related to an amount of the region of interest within the remote video data within the specific area of the display device displaying the overlay.

17. The method of claim 15, wherein the transparency of the overlay is increased by an amount that is directly related to an amount of time at least the threshold amount of the region of interest within the remote video data is within the specific area of the display device displaying the overlay.

18. The method of claim 15, wherein the transparency of the overlay is increased by a specific amount.

19. A computer program product comprising a non-transitory computer readable storage medium having instructions encoded thereon that, when executed by a processor, cause the processor to:

capture local video data of a local area within a field of view of an image capture device included in a receiving client device;

receive, at the receiving client device, remote video data of an area within a field of view of a remote image capture device included in a sending client device;

identify coordinates within the remote video data of one or more regions of interest within the remote video data;

display the remote video data on a display device of the receiving client device;

display the local video data as an overlay on the remote video data, the overlay displayed in a specific area of the display device and at least partially occluding remote video data displayed in the specific area of the display device;

determine, by the receiving client device, a threshold amount of a region of interest within the remote video data is within the specific area of the display device displaying the overlay for at least a threshold amount of time;

in response to determining, the receiving client device adjusting the display of the overlay to reduce the occlusion of the region of interest displayed in the specific area of the display device by the overlay.

20. The method of claim 1, wherein adjusting the display of the overlay to reduce the occlusion of the region of interest displayed in the specific area of the display device by the overlay comprises:

increase a transparency of the overlay displaying the local video data.

21. The method of claim 20, wherein the transparency of the overlay displaying the local video data is increased by an amount that is directly related to an amount of the region of interest within the remote video data within the specific area of the display device displaying the overlay.

22. The method of claim 20, wherein the transparency of the overlay displaying the local video data is increased by an amount that is directly related to an amount of time at least the threshold amount of the region of interest within the remote video data is within the specific area of the display device displaying the overlay.

23. The method of claim 20, wherein the transparency of the overlay displaying the local video data is increased by a specific amount.

24. The computer program product of claim 20, wherein the non-transitory computer readable storage medium further has instructions encoded thereon that, when executed by the processor, cause the processor to:

responsive to determining the threshold amount of the region of interest within the remote video data is no longer within the specific area of the display device displaying the overlay, display the local video data as the overlay on the remote video data in the specific area of the display device and at least partially occluding remote video data displayed in the specific area of the display device.

* * * * *